(12) United States Patent
Flegel

(10) Patent No.: US 9,035,782 B1
(45) Date of Patent: May 19, 2015

(54) TRANSFER SWITCH WITH GROUND CURRENT INDICATION

(71) Applicant: Reliance Controls Corporation, Racine, WI (US)

(72) Inventor: Michael O. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 158 days.

(21) Appl. No.: 13/777,245

(22) Filed: Feb. 26, 2013

(51) Int. Cl.
*G08B 21/00* (2006.01)
*G08B 21/18* (2006.01)

(52) U.S. Cl.
CPC .................................. *G08B 21/182* (2013.01)

(58) Field of Classification Search
CPC ....... G08B 21/182; H02H 7/06; H02J 7/0031; H02J 9/00; H02J 9/06
USPC .............. 340/644, 635, 638, 693.2, 649, 657, 340/664; 307/23, 64, 65, 66, 80, 116, 117, 307/126, 129; 200/50.32; 361/20, 21, 115; 324/74, 110
See application file for complete search history.

(56) References Cited

U.S. PATENT DOCUMENTS

| | | | |
|---|---|---|---|
| 4,110,808 A | 8/1978 | Hobson et al. | |
| 5,751,524 A | 5/1998 | Swindler | |
| 6,172,432 B1 * | 1/2001 | Schnackenberg et al. | ...... 307/23 |
| 7,446,437 B2 | 11/2008 | Paik et al. | |
| 7,521,822 B2 | 4/2009 | Lorenz | |
| 7,692,332 B2 | 4/2010 | Nordman et al. | |
| 7,932,635 B2 | 4/2011 | Shenoy et al. | |
| 7,995,315 B2 | 8/2011 | Riley et al. | |
| 2008/0277945 A1 * | 11/2008 | Lorenz | ......................... 290/40 A |
| 2010/0010684 A1 | 1/2010 | Lorenz et al. | |
| 2010/0187075 A1 * | 7/2010 | Flegel | ......................... 200/50.32 |

* cited by examiner

*Primary Examiner* — Anh V La
(74) *Attorney, Agent, or Firm* — Boyle Fredrickson, S.C.

(57) ABSTRACT

A transfer switch configured to detect a ground current is configured to selectively connect a first power source or a second power source to a load. Each of the power sources includes at least one "hot" lead and one neutral lead, and the transfer switch is configured to switch both the "hot" and the neutral leads. If the neutral switching portion of the transfer switch fails, current may be supplied to the load via the "hot" lead of one of the power sources and return from the load via a ground conductor and the neutral lead of the other power source. The transfer switch includes a current sensor, detecting current on the ground conductor, in order to detect such a condition. The signal from the current sensor is provided to a control circuit, which, in turn, activates an indicator if the current on the ground conductor exceeds a predefined level.

16 Claims, 2 Drawing Sheets

TRANSFER SWITCH WITH GROUND CURRENT INDICATION

BACKGROUND OF THE INVENTION

The present invention relates generally to transfer switches and, more particularly, to a transfer switch which detects the presence and provides an indication of ground currents.

Electrical panels, breaker boxes, or load centers frequently include a main contactor, switch, or breaker, which electrically isolates a series of individual circuit or load breakers from a utility power input. In a typical utility power input installation, the main contactor selectively connects or disconnects a first hot lead, L1, and a second hot lead, L2, with a respective bus bar, to which the individual circuit or load breakers are connected. A neutral lead, N, is connected to a neutral bar from which neutral connections are distributed to each of the loads. In addition, a ground connection is established in the load center, for example, by a ground bar connected to a conductive rod inserted into the ground or to a metal wire or pipe exiting the site into the ground. The ground bar provides connection points for ground conductors to be distributed to the loads as required. According to wiring standards, the neutral lead, N, from the utility power is connected to the ground connection at a single location within the electrical distribution system. Thus, in a standard installation, a bonding wire may be connected between the neutral bar and the ground bar in the load center.

The load center may also be configured to receive a secondary input power source, such as from a generator, to provide electrical power to certain of the individual loads or circuits in the event of a utility power failure. During interruption of utility power, the generator supplies power to the load center, which the load center distributes to selected circuits of the building. Depending on factors such as the size of the generator, the number of electrical loads, and whether a load is considered critical (i.e., must remain on during a utility power outage), such as a furnace, sump pump, etc., the secondary power source may power all of the electrical loads or only a portion of the loads. Similar to the utility power input, the generator includes a first hot lead, L1, a second hot lead, L2, and a neutral lead, N. The generator may also include a ground connection, such as a receptacle grounding terminal. The generator maybe configured either with a bond between the neutral lead, N, and the ground connection (i.e., a bonded-neutral generator) or without a bond between the neutral lead, N, and the ground connection (i.e., a floating-neutral generator).

In a non-separately derived system, the neutral lead, N, from the generator is solidly connected to the neutral connection from the utility supply, and the neutral lead, N, of the generator must neither be directly connected to an earth ground nor to the ground connection of the generator (i.e., a floating-neutral generator). As previously indicated, a connection between the neutral and ground leads should be established at a single location in the electrical distribution system. Because the neutral connection in the generator is floating, the connection between the neutral and ground leads is established in the service entrance panel. In the same manner as a distribution system having no generator, this connection may be established via a bonding wire connected between the neutral bar and the ground bar in the load center. The neutral lead from the generator is bonded with the neutral lead from the utility, for example, at the neutral bar. A transfer switch is provided to selectively connect the hot leads, L1 and L2, from either the utility or the generator to the electrical loads.

A generator that has its neutral lead, N, bonded to the ground connection of the generator (i.e., a bonded-neutral generator) must be installed as a separately derived system. The neutral conductor from the loads is switched between the neutral lead, N, of each of the power sources to maintain a single bonding point in the system. The neutral leads, N, of the utility power source and the secondary power source, such as the generator, are switched by the transfer switch in addition to the hot leads, L1 and L2. Further, the connection between neutral and ground for the utility system must occur prior to the switched neutral connection such that it is removed when the secondary power source is connected and the equipment grounds for the loads are separated from the neutral. Typically the neutral bar and the ground bar are not connected directly in a service entrance panel but rather they are combined into one dual-function terminal bar. This separation is needed in a service entrance transfer panel to keep the neutral and ground conductors separate when switched to the secondary power source since the connection between neutral and ground takes place further upstream toward the power source and cannot occur again in the panel.

A first potential problem arises when a bonded-neutral generator is connected to a service panel having a transfer switch that is only configured to switch the hot leads, L1 and L2. In such a configuration, multiple connection points can be established between the neutral leads and the ground leads, creating a second conduction path parallel to the neutral conduction path. As a result, a portion of the operating current for the electrical loads that is supposed to be conducted via the neutral lead may be present on the ground lead, resulting in an undesirable current on the ground lead.

A second potential problem arises when a bonded-neutral generator is connected to a service entrance panel having a transfer switch that is configured to switch the neutral lead, N, in addition to the hot leads, L1 and L2, in that the neutral switching portion of the transfer switch may fail. In the event the neutral portion of the transfer switch fails, the neutral lead, N, is no longer switched, and the neutral lead, N, of one of the power sources is always connected to the loads. When the power is supplied to the loads via the hot leads, L1 and L2, from the other power source, the power must return via the ground lead because the neutral lead, N, is no longer available. Again, an undesirable current is present on the ground lead.

SUMMARY OF THE INVENTION

The present invention is directed to a transfer switch configured to detect a ground current. The transfer switch is configured to selectively connect a first power source, such as the utility grid, or a second power source, such as a backup generator, to an electrical load. Each of the power sources includes at least one "hot" lead and one neutral lead, and the transfer switch is configured to switch the "hot" and the neutral leads. In the event of a failure of the neutral switching portion of the transfer switch, current may be supplied to the load via one of the power sources and return from the load via a ground conductor. In order to detect such a condition, the transfer switch includes a current sensor, detecting current on the ground conductor. The signal from the current sensor is provided to a control circuit, which, in turn, activates an indicator if the current on the ground conductor exceeds a predefined level.

According to one embodiment of the invention, a transfer switch for selectively connecting a first power supply or a second power supply to one or more electrical loads includes a first set of input terminals, a second set of input terminals, and a set of output terminals. The first set of input terminals is configured to receive a plurality of conductors from the first power source, which has at least one hot conductor and a neutral conductor. The second set of input terminals is configured to receive a plurality of conductors from the second power source, which has at least one hot conductor and a neutral conductor. The set of output terminals is configured to connect to a plurality of conductors configured to distribute power to the electrical loads. A transfer mechanism is movable between a first position and a second position. The transfer mechanism is configured to connect the first set of input terminals to the set of output terminals in the first position and to connect the second set of input terminals to the set of output terminals in the second position. A sensor is configured to generate a signal corresponding to an amplitude of current present on a ground conductor, and the ground conductor is electrically connected to the neutral conductor from either the first or second power source. A circuit is configured to receive the signal from the sensor and to generate an output signal if the amplitude of current present on the ground conductor exceeds a predefined threshold. An indicator is operatively connected to the output signal and is configured to provide one of a visual indication or an audio indication when the output signal indicates that the current present on the ground conductor exceeds the predefined threshold. The indicator may be a light emitting diode.

According to one aspect of the invention, the transfer mechanism includes a plurality of throws, corresponding to the number of conductors from one of the power sources, and a first pole and a second pole corresponding to each throw. The first pole is connected to a conductor from the first power source and the second pole is connected to a conductor from the second power source. A single actuator moves each throw between the first pole in the first position and the second pole in the second position.

According to another aspect of the invention, the transfer mechanism includes a first actuator movable between the first position and the second position to transfer the neutral conductors of each power source and at least one additional actuator movable between the first position and the second position to transfer the hot conductors of each power source. The transfer mechanism may also include a mechanical interlock defining a sequential operation of the first actuator and each additional actuator.

According to still other aspects of the invention, the transfer switch may include a set of ground terminals configured to receive a connection from the ground conductor, and the sensor is mounted internal to the transfer switch. The generated signal corresponds to the amplitude of current present at the ground terminals. Alternately, the transfer switch may include a set of signal terminals configured to receive the signal from the sensor, and the sensor is mounted external to the transfer switch.

According to another embodiment of the invention, a transfer switch for selectively connecting a first power supply or a second power supply to one or more electrical loads includes input means for electrically connecting the first and the second power supplies, output means for electrically connecting the electrical loads, switch means for selectively connecting one of the first power supply and the second power supply to the electrical loads, and a ground current indicator. The ground current indicator includes a sensor configured to generate a signal corresponding to an amplitude of current present on a ground conductor. A circuit is configured to receive the signal from the sensor and to generate an output signal if the amplitude of current present on the ground conductor exceeds a predefined threshold. An indicator is operatively connected to the output signal and is configured to provide one of a visual or audio indication when the output signal indicates that the amplitude of current present on the ground conductor exceeds the predefined threshold.

According to another aspect of the invention, the sensor may be configured to receive power from the ground conductor and to provide one or more reference inputs to the circuit. Alternately, the ground current indicator includes a power supply circuit configured to receive power from either a battery or a connection to the output terminals to provide one or more reference voltages to the circuit. The ground current indicator may also include a latching circuit generating a latched signal. The latched signal is set when the output signal indicates that the current present on the ground conductor exceeds the predefined threshold and is reset by an external input. An indicator is operatively connected to the latched signal and is configured to provide either a visual or an audio indication when the latched signal is set.

Various other features, objects and advantages of the present invention will be made apparent from the following detailed description of the drawing figures.

BRIEF DESCRIPTION OF THE DRAWINGS

Various exemplary embodiments of the subject matter disclosed herein are illustrated in the accompanying drawings in which like reference numerals represent like parts throughout, and in which.

DETAILED DESCRIPTION

The various features and advantageous details of the subject matter disclosed herein are explained more fully with reference to the non-limiting embodiments described in detail in the following description.

Figure 1:
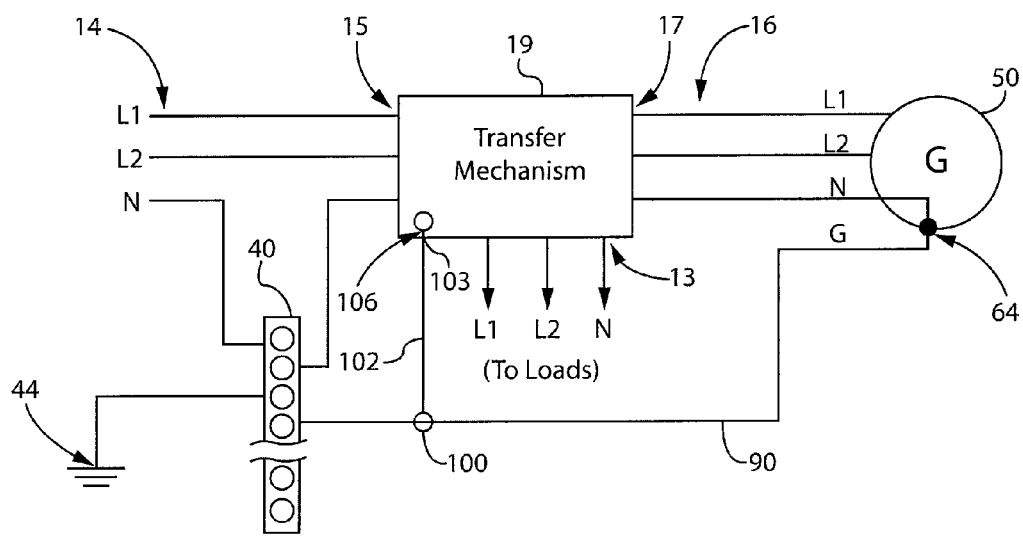
FIG. 1 is a block diagram representation of a transfer switch incorporating a ground current indicator according to one embodiment of the invention.

FIG. 1 illustrates a transfer mechanism 19 configured to selectively connect a first power source or a second power source to one or more electrical loads. The first power source may be, for example, the utility grid which, as illustrated, is a split-phase power distribution system. The second power source may be, for example, a backup generator 50 which is also configured to provide split-phase power, corresponding to the power provided by the first power source. In a split-phase power distribution system, three electrical conductors (e.g., two hot leads, L1 and L2, and a neutral lead, N) are configured to provide, for example, either 120V or 240V alternating current (AC) to the consumer. The 120 VAC is present between either of the hot leads, L1 or L2, and the neutral lead, N. The 240 VAC is present between the two hot leads, L1 and L2. According to another embodiment of the invention, the power source may be single phase and include a single hot lead, L1, and a neutral lead, N. A first set of electrical conductors 14 is provided between the first power source and a first set of input terminals 15 on the transfer mechanism 19. A second set of electrical conductors 16 is provided between the second power source and a second set of input terminals 17 on the transfer mechanism 19. A set of output terminals 13 is configured to establish an electrical connection between the transfer mechanism 19 and the electrical loads.

FIG. 1 illustrates a separately derived power distribution system. An earth ground 44 is provided which may be, for example, a copper rod sunk into the ground proximate to the entrance point to the building being supplied power. The earth ground 44 is connected to a ground bar 40, and the neutral lead, N, for the utility power source is connected to the ground bar 40 prior to its connection to the transfer mechanism 19. The generator 50 includes a ground connection 64, and a ground conductor 90 connects the ground connection 64 to the ground bar 40. The neutral lead, N, of the generator 50 is connected to the ground connection 64 prior to its connection to the transfer mechanism 19. Thus, the neutral lead, N, for each of the power sources is connected to the earth ground 44 prior to its connection to the transfer mechanism 19.

According to the illustrated embodiment, the transfer mechanism 19 further includes a light emitting diode (LED) 106 providing a visual indication of current present on the ground conductor 90. Optionally, other visual indicators and/or audible indicators of current present on the ground conductor 90 may be provided without deviating from the scope of the invention. A sensor 100 is provided to detect current on the ground conductor 90. The sensor 100 generates a signal 102 corresponding to an amplitude of current present on the ground conductor 90. As illustrated, the sensor 100 may be external to the transfer mechanism 19. One or more terminals 103 are provided on the transfer mechanism 19 to receive the signal 102, according to the application requirements. Optionally, the sensor 100 may be mounted internal to the transfer mechanism 19 and a pair of terminals (not shown) provided to route the ground conductor 90 through the transfer mechanism 19.

Figure 2:
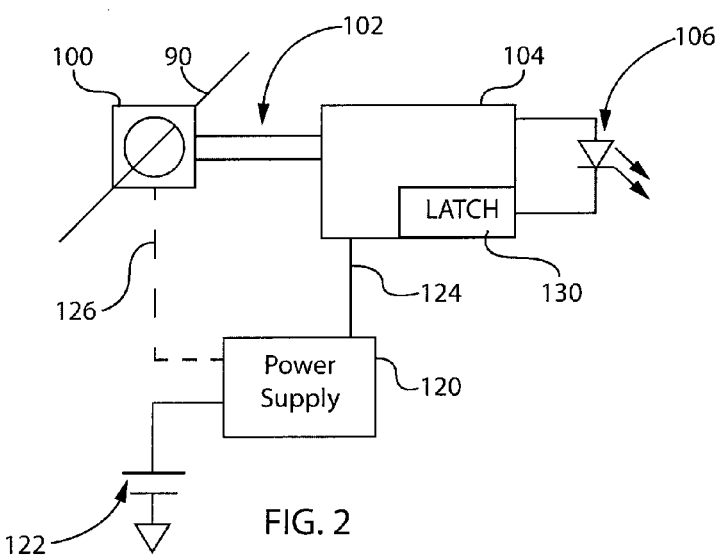
FIG. 2 is a block diagram representation of a ground current indicator according to one embodiment of the invention.

Referring also to FIG. 2, the signal 102 from the sensor 100 is provided to a circuit 104 which, in turn, controls whether the LED 106 is on or off as a function of the signal 102 from the sensor 100. According to one embodiment of the invention, the circuit 104 may include discrete logic devices. Optionally, the circuit 104 may include a microcontroller configured to execute a series of stored instructions to control operation of the indicator. The circuit 104 may be configured to receive power from the sensor 100. The sensor 100, in turn, includes inductive elements, in which power is induced via current flowing through the ground conductor 90. Optionally, an external power source 122, such as a battery may be provided. According to still another embodiment of the invention, the external power source 122 may be an electrical connection to the power sources being conducted by the transfer mechanism 19, for example, at the output terminals 13. A power supply circuit 120 may be included to regulate and/or convert power from the external power source 122 or from the sensor 100 to reference voltages 124 utilized by the circuit 104. A latching circuit 130 may also be provided and either integrated with or separate from the circuit 104. The latching circuit 130 may be connected in series with the LED 106 to provide a continuous indication of the presence of current on the ground conductor 90 or, optionally, a second LED 106 may be provided such that both instantaneous and latched indications of the presence of current on the ground conductor 90 may be provided.

Figure 3:
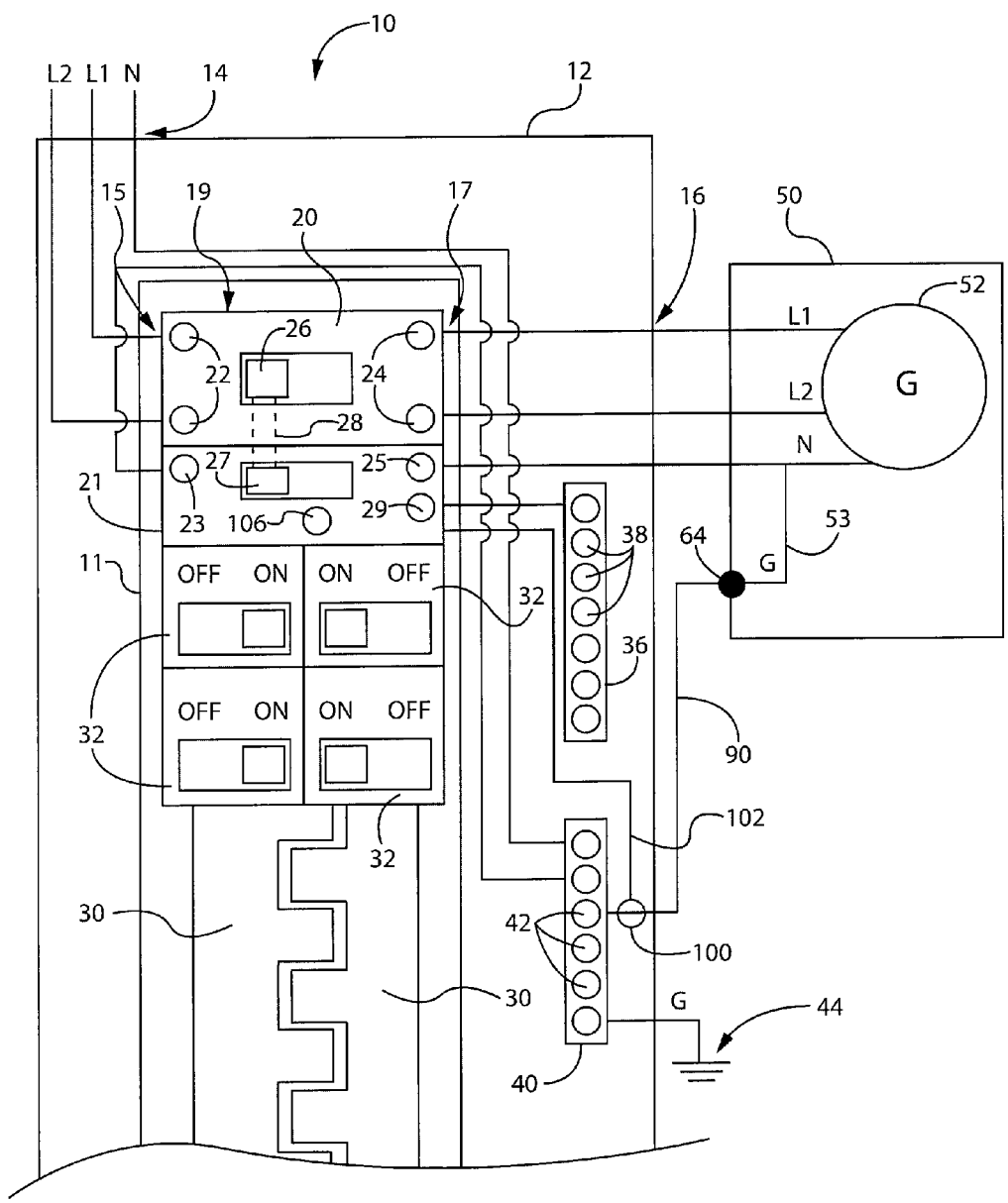
FIG. 3 is a schematic representation of a transfer switch incorporating a ground current indicator according to one embodiment of the invention connected between a utility grid and a backup generator.

FIG. 3 illustrates another embodiment of the transfer mechanism 19 incorporated into a load center 10. In this embodiment, the load center 10 includes a transfer mechanism 19, which has a first switch 20 for the "hot" leads L1, L2 and a second switch 21 for the neutral leads, N, configured to selectively provide electrical energy to a load from one of two power sources. The load center 10 includes an enclosure 12 having an electrical panel 11 mounted within the enclosure 12. The first switch 20 and the second switch 21 are each mounted to the electrical panel 11 and together receive a first set of electrical conductors 14 from a first power source, such as the utility power supply, at a first set of terminals 22, 23. The first switch 20 and the second switch 21 also receive a second set of electrical conductors 16 from a second power source, such as the backup generator 50, at a second set of terminals 24, 25. The first switch 20 includes a switch arm 26 movable between a first position, which connects each of the hot leads L1, L2 from the utility power source to one of a pair of terminal bars 30, and a second position, which connects each of the hot leads L1, L2 from the generator 50 to one of the terminal bars 30. The second switch 21 includes a switch arm 27 movable between a first position, which connects the neutral lead, N, from the utility power source to the switch output 29, and a second position, which connects the neutral lead, N, from the generator 50 to the switch output 29. Because the load center 10 includes a neutral switch (i.e., the second switch 21), the neutral lead, N, from the utility power source is grounded prior to the second switch 21. Thus, the neutral lead, N, from the utility power source is connected to a first terminal 42 of the ground bar 40 and the earth ground 44 is connected to another terminal 42 of the ground bar 40. A separate conductor runs from a second terminal 42 of the ground bar 40 to the first terminal 23 of the second switch 21, establishing a ground connection with the utility neutral lead prior to switching the neutral connections.

As illustrated, each of the switch arms 26, 27 is manually transferred between the first and second position. A mechanical interlock device 28 is included such that both switch arms 26, 27 are moved in tandem. Optionally, the mechanical interlock may be configured to toggle the switch arms 26, 27 in a desired sequence. According to another embodiment of the invention, a double throw, triple pole switch may include a single switch arm which simultaneously transfers connection of each of the hot leads L1, L2 and the neutral lead N of the load from one power source to the other. According to still another embodiment of the invention, a sensor may be included to monitor operation of the utility power source, and, if the utility power source fails, a solenoid or other actuator may be energized to automatically transfer each of the switch arms 26, 27 between the first and second positions. Alternately, still other configurations of manual and or automatic transfer switches may be employed without deviating from the scope of the invention.

The load center 10 distributes the power from one of the two sources to an electrical load. Circuit breakers 32 are mounted to the terminal bars 30 such that a first terminal on the rear of each circuit breaker 32 establishes an electrical connection with the terminal bar 30 to which it is mounted. A second terminal on the side of each circuit breaker 32 is configured to receive a first electrical conductor providing power to the load. The neutral switch output 29 is electrically connected to one of the terminals 38 on a neutral bar 36. Other terminals 38 of the neutral bar 36 are configured to receive a second electrical conductor providing power to the load. The first and second electrical conductors define a forward conduction path and a return conduction path, establishing a circuit, between the load center 10 and the load. One or more of the circuits may also include a ground conductor. A ground bar 40 includes multiple terminals 42 to which each of the ground conductors may be connected. An earth ground 44, which may be, for example, a copper rod sunk into the ground next to the building in which the load center 10 is housed, is electrically connected to the ground bar 40.

The generator 50 is connected to the load center 10 to provide a secondary energy source. The generator 50 includes an energy generation device 52 in a manner as is known. According to one embodiment of the invention, the energy generation device includes a combustion engine fueled by gasoline, diesel fuel, propane, or any other fuel. As the combustion engine operates, it spins a rotor within a stator of a generator. The rotor has permanent magnets mounted thereto which excite the windings of the stator, generating electricity. Optionally, various other configurations of an energy generation device 52 may be utilized without deviating from the scope of the invention. The windings on the stator are configured to provide at least one hot lead, L1, and a neutral lead, N. As illustrated, the windings of the energy generation device 52 provide a first hot lead, L1, and a second hot lead, L2, in addition to the neutral lead, N. A ground lead, G, may be connected, for example to the chassis of the generator 50. The generator 50 also includes a ground connection 64. The generator 50 is normally connected to the earth ground 44 via a ground conductor 90 connected between the ground connection 64 and one of the terminals 42 on the ground bar 40. A bonding jumper 53, which may be internal to the generator 50, connects the neutral lead, N, to the ground conductor 90.

In operation, the circuit 104 is configured to provide an indication of current flow on the ground conductor 90. The sensor 100 generates a signal 102 corresponding to the amplitude of current conducted by the ground conductor 90. The signal 102 may be, for example, a 0-5 V signal where zero volts corresponds to no current flow and five volts corresponds to twenty amps of current flow with a linear variation between zero and five volts. Optionally, the signal 102 may be generated in other ranges, such as 0-24 V or 4-20 mA, corresponding to different values of current according to the application requirements. The circuit 104 may include a comparator circuit, such as an operational amplifier, which compares the signal 102 from the sensor 100 to a reference voltage. The output of the comparator circuit may be configured to turn on or off an LED 106. If, for example, the signal 102 is greater than the reference voltage, the output of the comparator circuit may be driven high to provide a voltage across the LED 106, turning the LED 106 on; however, if the signal 102 is less than the reference voltage, the output of the comparator circuit may be driven low to remove the voltage across the LED 106, turning the LED 106 off.

According to another aspect of the invention, the transfer mechanism 19 may include a latching circuit 130. Because a secondary power source may be connected intermittently, for example, during a power outage, the presence of current on the ground conductor 90 may only occur intermittently as well. If, for example, a bonded-neutral generator 50 is connected to a transfer mechanism 19 which does not switch the neutral leads (i.e., a non-separately derived system), current may be present on the ground conductor 90 only when the generator 50 is operational. When the generator 50 is not operational, the current is removed and the LED 106 is turned off. Unless a user sees the indication provided by the LED 106 while it is on, the user will be unaware of the potential problem. The latching circuit 130 is configured to maintain an output signal until a user resets the output signal. The latching circuit 130 includes an external power source 122 such that it may maintain a signal once detected. Appropriate logic devices, such as flip-flops, may be included in the latching circuit 130 to maintain the output signal. Further an input, such as a button or switch, is provided for the user to reset the output signal upon observing that the output signal was on. The latching circuit 130 may be connected to the first LED 106 and keep it on or, alternately, a second LED 106 may be provided. The first LED 106 provides a visual indication of current presently being conducted on the ground conductor 90 and the second LED 106 provides a visual indication of current at some point, prior to being reset, being conducted on the ground conductor 90. According to one embodiment of the invention, the latching circuit 130 may be integrated with the circuit 104. Alternately, the latching circuit 130 may be independent of the circuit 104.

According to another embodiment of the invention, the circuit 104 may include a microprocessor. The microprocessor may be connected to external memory or have memory integrated on a single device. The microprocessor may be configured to receive the signal 102 as an input, execute a series of instructions stored in memory, and generate an output as a function of the signal 102 from the sensor 100. The amplitude of current represented by the input signal 102 may be compared to a threshold value also stored in memory and the output enabled if the amplitude of current exceeds the threshold value. The latching circuit 130 may similarly be implemented in the microprocessor. Additional instructions may be executed to maintain an output signal after detecting current on the ground conductor 90. Another input may be provided to the microprocessor to receive a signal from the user acknowledging and resetting the latched output signal.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

What is claimed is:

1. A transfer switch for selectively connecting a first power supply or a second power supply to one or more electrical loads, the transfer switch comprising:
   a first input configured to receive power from the first power source, the first power source having at least one hot conductor and a neutral conductor;
   a second input configured to receive power from the second power source, the second power source having at least one hot conductor and a neutral conductor;
   an output configured to distribute power to the electrical loads;
   a transfer mechanism having a housing configured to be mounted in an enclosure separate from the first power supply and the second power supply, the transfer mechanism movable between a first position and a second position, wherein the transfer mechanism is configured to connect the first input to the output in the first position and to connect the second input to the output in the second position;
   a sensor configured to generate a signal corresponding to an amplitude of current present on a ground conductor, wherein the ground conductor is electrically connected to the neutral conductor from at least one of the first power source and the second power source;
   a circuit mounted within the housing of the transfer mechanism and configured to receive the signal from the sensor and to generate an output signal if the amplitude of current present on the ground conductor exceeds a predefined threshold; and an indicator mounted within the housing of the transfer mechanism and operatively connected to the output signal and configured to provide one of a visual indication or an audio indication when the output signal indicates that the current present on the ground conductor exceeds the predefined threshold.

2. The transfer switch of claim 1 wherein the indicator is a light emitting diode.

3. The transfer switch of claim 1 wherein the transfer mechanism includes:
   a plurality of poles, wherein the number of poles corresponds to the number of conductors provided from one of the power sources;
   a first throw and a second throw corresponding to each pole, wherein the first throw is connected to a conductor from the first power source and the second throw is connected to a conductor from the second power source; and
   a single actuator configured to move each pole between the first throw in the first position and the second throw in the second position.

4. The transfer switch of claim 1 wherein the transfer mechanism includes:
   a first actuator movable between the first position and the second position to transfer the neutral conductors of each power source; and
   at least one additional actuator movable between the first position and the second position to transfer the hot conductors of each power source.

5. The transfer switch of claim 4 wherein the transfer mechanism includes a mechanical interlock defining a sequential operation of the first actuator and each additional actuator.

6. The transfer switch of claim 1 further comprising a set of ground terminals configured to receive a connection from the ground conductor, wherein the sensor is mounted internal to the transfer switch and the generated signal corresponds to the amplitude of current present at the ground terminals.

7. The transfer switch of claim 1 further comprising a set of signal terminals configured to receive the signal from the sensor, wherein the sensor is mounted external to the transfer switch.

8. The transfer switch of claim 1 wherein the sensor is configured to receive power from the ground conductor and to provide one or more reference inputs to the circuit.

9. The transfer switch of claim 1 further comprising a power supply circuit configured to receive power from one of a battery and a connection to the output terminals and configured to provide one or more reference voltages to the circuit.

10. The transfer switch of claim 1 further comprising:
    a latching circuit generating a latched signal which is set when the output signal indicates that the current present on the ground conductor exceeds the predefined threshold and which is reset by an external input; and
    an indicator operatively connected to the latched signal and configured to provide one of a visual or audio indication when the latched signal is set.

11. A transfer switch for selectively connecting a first power supply or a second power supply to one or more electrical loads, the transfer switch comprising:

input means for electrically connecting the first and the second power supplies;

output means for electrically connecting the electrical loads;

switch means for selectively connecting one of the first power supply and the second power supply to the electrical loads, wherein the switch means include a housing configured to be mounted in an enclosure separate from the first and the second power supplies; and a ground current indicator, comprising:
   a sensor configured to generate a signal corresponding to an amplitude of current present on a ground conductor;
   a circuit mounted within the housing of the transfer mechanism and configured to receive the signal from the sensor and to generate an output signal if the amplitude of current present on the ground conductor exceeds a predefined threshold; and
   an indicator mounted within the housing of the transfer mechanism and operatively connected to the output signal and configured to provide one of a visual or audio indication when the output signal indicates that the amplitude of current present on the ground conductor exceeds the predefined threshold.

12. The ground current indicator of claim 11 wherein the indicator is a light emitting diode.

13. The ground current indicator of claim 11 wherein the sensor is configured to receive power from the ground conductor and to provide one or more reference inputs to the circuit.

14. The ground current indicator of claim 11 further comprising a power supply circuit configured to receive power from one of a battery and a connection to the output terminals and configured to provide one or more reference voltages to the circuit.

15. The ground current indicator of claim 11 further comprising:
    a latching circuit generating a latched signal which is set when the output signal indicates that the current present on the ground conductor exceeds the predefined threshold and which is reset by an external input; and
    an indicator operatively connected to the latched signal and configured to provide one of a visual indication or an audio indication when the latched signal is set.

16. A method of providing a ground current alert in a transfer switch that selectively connects a first power supply or a second power supply to one or more electrical loads, wherein the transfer switch has a housing configured to be mounted in an enclosure separate from the first power supply and the second power supply, a first input configured to receive power from the first power source, the first power source having at least one hot conductor and a neutral conductor, a second input configured to receive power from the second power source, the second power source having at least one hot conductor and a neutral conductor, an output configured to distribute power to the electrical loads, and a transfer mechanism movable between a first position and a second position, wherein the transfer mechanism is configured to connect the first input to the output in the first position and to connect the second input to the output in the second position, comprising the steps of:
    sensing current on a ground conductor; and
    providing a sensory indication on the transfer switch when the current present on the ground conductor exceeds a predefined threshold.

* * * * *